United States Patent Office 3,312,689
Patented Apr. 4, 1967

3,312,689
10-(BASIC SUBSTITUTED)-DIBENZODIAZEPINES
Jean Schmutz, Muri, near Bern, and Fritz Hunziker, Bern, Switzerland, assignors to Dr. A. Wander, S.A., Bern, Switzerland, a corporation of Switzerland
No Drawing. Filed Jan. 2, 1964, Ser. No. 335,344
Claims priority, application Switzerland, Sept. 22, 1959, 78,518/59, 78,521/59
19 Claims. (Cl. 260—239)

This application is a continuation-in-part of our application for United States Letters Patent Ser. No. 222,967, filed Sept. 11, 1962, now abandoned, the latter being in turn a continuation-in-part of our application Ser. No. 57,122, filed Sept. 20, 1960, now abandoned, and also a continuation-in-part of our application Ser. No. 57,141, filed Sept. 20, 1960, also now abandoned.

This invention relates to novel heterocyclic nitrogen-containing compounds. More specifically, it relates to 10 - (basic substituted) - 10,11-dihydro-5H-dibenzo[b,e] [1,4]diazepines having the general formula:

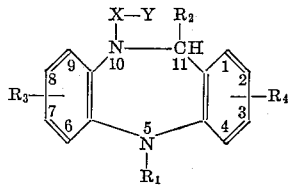

(I)

and salts, such as the acid addition salts and the quaternary ammonium salts thereof. In the above Formula I the letter symbols have the following meanings: X represents alkylene having 2 or 3 inclusive carbon atoms, and more specifically, X represents ethylene, propylene, or isopropylene; Y is a member selected from the class consisting of dialkylamino having from 2 to 4 inclusive carbon atoms, pyrrolidino, piperidino, and morpholino; $R_1$ and $R_2$ represent, interchangeably, a member of the class consisting of hydrogen, methyl, and ethyl; and $R_3$ and $R_4$ represent, interchangeably, a member of the class consisting of hydrogen, chlorine, methyl, ethyl, methoxy, and ethoxy.

The new compounds of this invention are obtained by introducing the basic substituent —X—Y in the 10- position of a corresponding 10,11-dihydro-5H-dibenzo[b,e] [1,4]diazepine compound. The starting compounds used in this process are represented by the general formula:

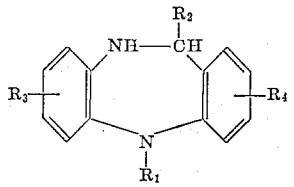

(II)

In this formula, the letter symbols $R_1$, $R_2$, $R_3$ and $R_4$ have the same meaning as identified above. In order to introduce the basic substituent —X—Y, the Formula II compound is reacted with an ester of a basic alcohol having the formula Z—X—Y, wherein X and Y have the meanings described above and Z represents an acid residue, particularly the acid residue of inorganic or organic acids such as hydrohalogen acids, sulfonic acids or carbonic acid. The reaction with esters of hydrohalogen acid or sulfonic acid is preferably carried out by prior or concurrent metallization of the Formula II compound using a suitable condensing agent, particularly the alkali metals, their hydrides, amides, or other organic alkali metal compounds, e.g. sodium amide, sodium hydride, phenyl sodium, or tertiary butyl sodium. No condensing agent is necessary if the reaction is performed using a carbonic acid ester.

Those compounds of Formula I according to this invention wherein $R_2$ denotes hydrogen, can also be obtained by effecting reduction of the corresponding 10-(basic substituted) - 10,11 - dihydro - 11-oxo-5H-dibenzo [b,e][1,4]diazepines. The starting materials to be subject to reduction in accordance with this second process are represented by the general formula:

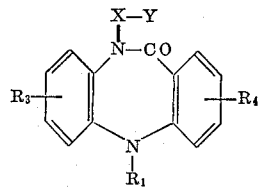

(III)

The reduction of the —CO— group of the compounds of the type represented by Formula III to obtain the products of Formula I may be effected by the usual techniques for the reduction of an amide, e.g. by reaction with metal hydrides, by reaction with hydrogen (especially in the presence of a catalyst such as copper chromite), by electrolytic reduction, etc. We have found the use of lithium-aluminium hydride as a reducing agent to be particularly advantageous.

The starting materials used in this second process and having the Formula III can be obtained by reaction of the corresponding 10-unsubstituted diazepine compounds with an ester of a tertiary aminoalkanol of the formula Z—X—Y, wherein Z represents an acid residue radical, if necessary after previous metallization of the 10-unsubstituted diazepine compounds.

As disclosed above, the symbol $R_1$ of the starting materials of Formula II or III, respectively, may be hydrogen, methyl or ethyl. If the symbol $R_1$ is hydrogen, the products obtained in both processes mentioned above may be subsequently methylated or ethylated to obtain products of Formula I wherein $R_1$ is methyl or ethyl, respectively, e.g. by metallizing the compound and thereafter reacting the metallized compound in a known manner with a methyl or ethyl halide.

The compounds of the Formula I type are strong bases which may readily be converted into water soluble addition salts of non-toxic inorganic and organic acids. For example, suitable inorganic acid addition salts include the hydrochlorides, hydrobromides, sulfates, nitrates, and phosphates. Suitable organic acid addition salts include, e.g. the acetates, oxalates, malonates, succinates, maleates, tartrates, or toluene sulfonates. The mono- and di-quaternary lower alkyl ammonium derivatives may also be prepared, for example, by reacting the bases with a quaternizing agent such as a dialkylsulfate, an alkyl halide, or a sulfonic alkyl ester. Alternatively, the quaternary ammonium derivatives of the Formula I compounds may be obtained by utilizing as starting materials the quaternary ammonium derivatives of the Formula III compounds.

The new 10-(basic substituted)-10,11-dihydro-5H-dibenzo-[b,e][1,4]diazepines according to the invention, including the bases (I) per se as well as the addition salts with non-toxic acids and the lower alkyl quaternary ammonium halides, sulfates, and sulfonates of the same, are useful as medicaments, and more specifically as anti-convulsants, antidepressants, and spasmolytics. They may be administered, for example, in the form of pharmaceutical preparations, which contain the new compound or a salt thereof in admixture with a pharmaceutical organic or inorganic solid or liquid carrier suitable for enteral, parental or topical administration. For making up the preparation, there can be employed substances which are compatible with the new compounds, such as water, gelatine, lactose, starches, magnesium stearate, talc, vegetable oils, benzyl alcohols, gums, polyalkylene glycols, petroleum jelly or another known carrier for medicaments. The pharmaceutical preparations may be, for exmple, in the form of tablets, dragees, salves, creams, or in liquid form, such as solutions, suspensions or emulsions. If desired, they may be sterilized and/or contain auxiliary substances, such as preserving agents, stabilizing agents, wetting or emulsifying agents, salts for varying the osmotic pressure, or buffers. They may also contain other therapeutically useful substances. The preparations are obtained by the usual methods employed in formulating pharmaceutical dosage forms.

The following non-limiting examples will further illustrate the inventon:

EXAMPLE 1

A solution of 4.6 g. of 10-β-dimethylamino-ethyl-10,11-dihydro - 11-oxo-5H-dibenzo[b,e][1,4]diazepine in 30 ml. of tetrahydrofuran was added within 20 minutes to 2.0 g. of lithium-aluminium hydride in 30 ml. of absolute tetrahydrofuran while stirring. The mixture was thereafter heated for 3 hours under reflux, excess lithium-aluminium hydride was destroyed with acetic ester, and the reaction mixture was dried in vacuo. The residue was distributed between water and ether, inorganic hydroxides were separated out by filtration, and the organic base was extracted with acetic acid from the filtrate. By precipitating the base with ammonia, taking up in either and working up the ethereal solution, there were obtained 3.76 g. (86% of the theoretical yield) of 10-β-dimethylamino-ethyl - 10,11-dihydro-5H-dibenzo[b,e][1,4]-diazepine in the form of a yellowish oil having the boiling point of 166–168° C./0.05 mm. Hg.

By adding an equimolar quantity of maleic acid to the base thus obtained in methanol, evaporating the solvent and recrystallizing the residue from acetone/acetic ester 1:3, the maleate was obtained in the form of compact crystals with the melting point 100° C.

EXAMPLE 2

Using the same procedure as in Example 1, but starting with 5.80 g. of 5-methyl-10-β-dimethylamino-ethyl-10,11-dihydro - 11-oxo- 5H-dibenzo[b,e][1,4]diazepine, dissolved in 40 ml. of absolute tetrahydrofuran, and adding a suspension of 2.5 g. of lithium-aluminium hydride in 50 ml. of tetrahydrofuran, there were obtained 4.47 g. (81% of the theoretical yield) of 5-methyl-10-β-dimethylamino-ethyl - 10,11-dihydro - 5H-dibenzo[b,e][1,4]diazepine with the boiling point 155–160° C./0.07 mm. Hg.

By adding an equimolar quantity of maleic acid to the base thus obtained in methanol, evaporating the solvent and recrystallizing the residue from acetone/ether 1:3, the maleate with the melting point 149–151° C. was obtained.

EXAMPLE 3

Using the same procedure as in Example 1, but starting with 7.74 g. of 10-γ-dimethylamino-propyl-10,11-dihydro-11-oxo-5H-dibenzo[b,e][1,4]diazepine in 40 ml. of absolute tetrahydrofuran and adding a suspension of 3.0 g. of lithium-aluminium hydride in 50 ml. of tetrahydrofuran, there were obtained 6.05 g. (82% of the theoretical yield) of 10-γ-dimethylamino-propyl-10,11-dihydro-5H-dibenzo[b,e][1,4]diazepine in the form of a highly viscous oil with the boiling point 160° C./0.05 mm. Hg.

EXAMPLE 4

In accordance with Example 1, 4.63 g. (76% of the theoretical yield) of 5-methyl-10-γ-dimethylamino-propyl-10,11-dihydro - 5H-dibenzo[b,e][1,4]diazepine in the form of a highly viscous oil having the boiling point 162° C./0.05 mm. Hg. were obtained by dissolving 6.37 g. of 5-methyl-10-γ-dimethylamino-propyl-10,11-dihydro-11-oxo - 5H-dibenzo[b,e][1,4]diazepine in 40 ml. of absolute tetrahydrofuran and adding a suspension of 2.5 g. of lithium-aluminium hydride in 50 ml. of tetrahydrofuran.

By adding an equimolar quantity of maleic acid to the base thus obtained in methanol, removing the solvent and recrystallizing the residue from acetic ester and then from methanol/ether 1:4, the maleate was obtained in the form of yellowish prisms having the melting point 145–148° C.

EXAMPLE 5

Using the same procedure as in Example 1, but starting with 10.58 g. of 8-chloro-10-β-dimethylamino-ethyl-10,11-dihydro - 11-oxo - 5H-dibenzo[b,e][1,4]diazepine, dissolved in 100 ml. of absolute tetrahydrofuran, and adding a suspension of 4.5 g. of lithium-aluminium hydride in 50 ml. of tetrahydrofuran, 7.25 g. (73% of the theoretical yield) of 8-chloro-10-β-dimethylaminoethyl-10,11-dihydro - 5H-dibenzo[b,e][1,4]diazepine were obtained in the form of a highly viscous yellowish oil with the boiling point 176° C./0.01 mm. Hg.

EXAMPLE 6

Using the same procedure as in Example 1, but starting with 6.37 g. of 8-chloro-10-γ-dimethylamino-propyl-10,11-dihydro - 11-oxo - 5H-dibenzo[b,e][1,4]diazepine, dissolved in 40 ml. of absolute tetrahydrofuran, and adding a suspension of 3.0 g. of lithium-aluminium hydride in 40 ml. of tetrahydrofuran, 4.71 g. (77% of the theoretical yield) of 8-chloro-10-γ-dimethylaminopropyl-10,11-dihydro - 5H-dibenzo[b,e][1,4]diazepine were obtained in the form of a yellowish oil with the boiling point of 185–187° C./0.05 mm. Hg.

By adding an equimolar quantity of hydrochloric acid to the base thus obtained in methanol, removing the solvent and recrystallizing the residue from acetone, containing a trace of methanol, and ether in the ratio of 1:3, the hydrochloride with the melting point of 101–107° C. was obtained.

EXAMPLE 7

3.80 g. of 5-methyl-10,11-dihydro-5H-dibenzo[b,e][1,4]-diazepine were boiled for 45 minutes with 0.85 g. of sodium amide in 30 ml. of absolute dioxane. After addition of a benzenic solution of β-dimethylamino-ethylchloride freshly prepared by treatment of 3.40 g. of β-dimethylamino-ethylchloride hydrochloride with concentrated sodium hydroxide solution, the mixture was boiled for 4 hours under reflux, whereupon the reaction mixture was concentrated to dryness by evaporation in vacuo and the residue was distributed between ether and water. By exhaustive extraction with dilute acetic acid, precipitation with ammonia, extraction with ether and working up of the ethereal solution, there were obtained 3.75 g. of 5-methyl-10-β-dimethylamino-ethyl-10,11-dihydro - 5H - dibenzo[b,e][1,4]diazepine with the boiling point of 150–153° C./0.03 mm. Hg, which by treatment with maleic acid in methanol yielded a maleate of the melting point of 149–151° C.

EXAMPLE 8

8.0 g. of 5,11-dimethyl-10,11-dihydro-5H-dibenzo[b,e][1,4]-diazepine were dissolved in 150 ml. of absolute dioxane and heated with 1.5 g. of sodium amide for 2 hours under reflux. The base liberated from 6.2 g. of γ-dimethylamino-propylchloride hydrochloride in 50 ml. of absolute toluene was then added and the mixture was heated for another 6 hours under reflux. The solvent was then removed in vacuo, the residue was dissolved in dilute acetic acid and extracted by shaking with ether. The aqueous acetic acid phase was made alkaline with ammonia solution, and the separated base was extracted with ether. 8.5 g. of 5,11-dimethyl-10-γ-dimethylamino-propyl-10,11-dihydro-5H-dibenzo - [b,e][1,4]diazepine were obtained as an oil with the boiling point of 155–159° C./ 0.008 mm. Hg.

The base was dissolved with an equimolar quantity of maleic acid in acetone. On adding some ether, the maleate crystallized in the form of colourless crystals with the melting point of 121.5–122° C.

EXAMPLE 9

Using the same procedure as in Example 8, and from 11.0 g. of 5,11-dimethyl-10,11-dihydro-5H-dibenzo[b,e][1,4]diazepine, 2.12 g. of sodium amide in 200 ml. of absolute dioxane, and 7.8 g. of β-dimethylamino-ethylchloride hydrochloride, there were obtained 10.8 g. of 5,11-dimethyl-10-β-dimethylamino-ethyl-10,11 - dihydro - 5H-dibenzo[b,e][1,4]diazepine as an oily base with a boiling point of 145–148° C./0.01 mm. Hg.

The base was dissolved in alcohol with an equimolar quantity of tartaric acid. On adding ether, the tartrate crystallized in the form of colourless crystals with the melting point of 125–127° C.

EXAMPLE 10

Using the same procedure as in Example 8, and from 10.0 g. of 5,11-dimethyl-10,11-dihydro-5H-dibenzo[b,e][1,4]-diazepine, 1.9 g. of sodium amide in 200 ml. of absolute dioxane, and 8.3 g. of γ-piperidino-propylchloride, there were obtained 9.5 g. of 5,11-dimethyl-10-γ-piperidino-propyl-10,11-dihydro - 5H - dibenzo[b,e][1,4]diazepine as an oil having the boiling point of 170–175° C./ 0.01 mm. Hg.

The base was dissolved with an equimolar quantity of maleic acid in acetone. On adding ether, the maleate crystallized in the form of colourless crystals with the melting point of 157–159° C.

EXAMPLE 11

Using the same procedure as in Example 8, 10.5 g. of 11.2 g. of 5,11-dimethyl-10,11-dihydro-5H-dibenzo[b,e][1,4]-diazepine, 1.38 g. of sodium hydride in 200 ml. of absolute dioxane, and 11.2 g. of β-piperidino-ethylchloride hydrochloride, there were obtained 10.0 g. of 5,11-dimethyl-10-β-piperidino-ethyl-10,11 - dihydro - 5H - dibenzo[b,e][1,4]diazepine as an oily base with the boiling point of 170–174° C./0.01 mm. Hg.

The base was dissolved with an equimolar quantity of maleic acid in acetone. On adding ether, the maleate crystallized in the form of colourless crystals with the melting point of 152–154° C.

EXAMPLE 12

Using the same procedures as in Example 8, 10.5 g. of 5-methyl-10,11-dihydro - 5H - dibenzo[b,e][1,4]diazepine were metallized with 2.15 g. of sodium amide in 150 ml. of absolute dioxane and thereafter treated with a solution of γ-dimethyl-amino-propylchloride which had been prepared from 8.7 g. of the hydrochloride in 50 ml. of toluene. There were obtained 9.8 g. of 5-methyl-10-γ-dimethylamino-propyl-10,11 - dihydro - 5H - dibenzo[b,e][1,4]diazepine with the boiling point of 158–160° C./0.03 mm. Hg. The maleate thereof had the melting point of 145–148° C.

EXAMPLE 13

By the same procedure as in Example 8 and using 17.0 g. of the same starting compound, but employing the chlorine base obtained from 13.2 g. of β-morpholino-ethylchloride hydrochloride, there were obtained 6.4 g. of 5,11-dimethyl-10-β-morpholino-ethyl-10,11-dihydro - 5H-dibenzo[b,e][1,4]diazepine in the form of a viscous, yellowish oil with a boiling point of 185–190° C./0.01 mm. Hg.

EXAMPLE 14

By the same procedure as in Example 8 and using 13.0 g. of the same starting compound, but employing the chlorine base obtained from 14.0 g. of γ-morpholino-propylchloride hydrochloride, there were obtained 5.9 g. of 5,11-dimethyl-10-γ-morpholino-propyl - 10,11 - dihydro-5H-dibenzo[b,e][1,4]diazepine as a viscous oil with a boiling point of about 200° C./0.01 mm. Hg.

EXAMPLE 15

By treating a solution of 3.0 g. of 7-chloro-10-β-dimethylamino-ethyl - 10,11 - dihydro-11-oxo-5H-dibenzo[b,e][1,4]diazepine in 50 ml. of absolute tetrahydrofuran with a slurry of 1.2 g. of lithium-aluminium hydride in 25 ml. of tetrahydrofuran in the same way as in Example 1, 1.75 g. of 7-chloro-10-β-dimethylamino-ethyl-10,11-dihydro - 5H - dibenzo[b,e][1,4]diazepine were obtained which after crystallization from ether/petroleum ether (1:3) showed a melting point of 86–88° C.

By proceeding in analogous manner as described in the precedent examples, the following further compounds in accordance with Formula I were obtained:

EXAMPLE 16

2-chloro-10-β-dimethylamino-ethyl - 10,11-dihydro-5H-dibenzo[b,e][1,4]diazepine, boiling point 175–177° C./ 0.1 mm. Hg.

EXAMPLE 17

7-chloro-10-β-piperidino - ethyl - 10,11 - dihydro - 5H-dibenzo[b,e][1,4]diazepine, melting point 108–109° C.

EXAMPLE 18

5-methyl-7-chloro-10 - β - dimethylamino - ethyl-10,11-dihydro - 5H - dibenzo[b,e][1,4]diazepine, boiling point 170–171° C./0.05 mm. Hg; melting point of the maleate 140–142° C.

EXAMPLE 19

5-methyl-7-methylthio - 10 - β - dimethylamino - ethyl-10,11-dihydro - 5H - dibenzo[b,e][1,4]diazepine, boiling point 205–207° C./0.05 mm. Hg; melting point of the maleate 134–137° C.

EXAMPLE 20

5,8-dimethyl-10 - β - dimethylamino - ethyl - 10,11 - dihydro-5H-dibenzo[b,e][1,4]diazepine, boiling point 151–158° C./0.03 mm. Hg; melting point of the maleate 159–162° C.

EXAMPLE 21

8-methoxy-10-β-dimethylamino-ethyl - 10,11 - dihydro-5H-dibenzo[b,e][1,4]diazepine, boiling point 180–181° C./0.05 mm. Hg.

EXAMPLE 22

5-methyl-8-methoxy-10 - β-dimethylamino-ethyl-10,11-dihydro - 5H - dibenzo[b,e][1,4]diazepine, boiling point 170–175° C./0.01 mm. Hg.

EXAMPLE 23

7-chloro-10-β-dimethylamino-ethyl - 10,11-dihydro-5H-dibenzo[b,e][1,4]diazepine, melting point 86–88° C.

The following compounds further illustrate the scope of the present invention:

3-chloro-10-β-dimethylamino - ethyl-10,11-dihydro-5H-dibenzo[b,e][1,4]-diazepine, 8-methyl-10 - β - dimethylamino-ethyl - 10,11-dihydro-5H-dibenzo-[b,e][1,4]-diazepine, 7-methoxy-10-β-dimethylamino - ethyl - 10,11-dihydro-5H-dibenzo[b,e][1,4]-diazepine, 3,11-dimethyl - 10 - β - dimethylamino-ethyl - 10,11-dihydro-5H-dibenzo-[b,e][1,4]-diazepine, 5,11-dimethyl-10 - β - dimethylamino - ethyl - 10,11-dihydro-5H-dibenzo-[b,e][1,4]-diazepine, 8,11-dimethyl-10 - β - dimethylamino - ethyl - 10,11-dihydro-5H-dibenzo-[b,e][1,4]-diazepine, 3-chloro-10-γ-dimethylamino-propyl - 10,11 - dihydro-5H-dibenzo-[b,e][1,4]-diazepine, 8-methyl-10-γ-dimethylamino-propyl - 10,11 - dihydro-5H-dibenzo-[b,e][1,4]-diazepine, 7-methoxy-10-γ-dimethylamino-propyl - 10,11-dihydro-5H-dibenzo-[b,e][1,4]-diazepine, 3,11-dimethyl-10-γ-dimethylamino - propyl - 10,11 - dihydro-5H-dibenzo-[b,e][1,4]-diazepine, 5,11-dimethyl-10-γ-dimethylamino - propyl - 10,11 - dihydro-5H-dibenzo-[b,e][1,4]-diazepine, 8,11-dimethyl-10-γ-dimethylamino - propyl - 10,11 - dihydro-5H-dibenzo-[b,e][1,4]-diazepine, 8-methoxy-10-γ-dimethylamino-propyl - 10,11-dihydro-11-methyl-5H-dibenzo-[b,e][1,4]-diazepine, 8-methylmercapto-10-γ-dimethylamino-propyl - 10,11-dihydro-11-methyl-5H-dibenzo-[b,e][1,4]-diazepine, 5-methyl-8-chloro-10 - β - morpholino-ethyl - 10,11-dihydro-5H-dibenzo[b,e][1,4]-diazepine, 5-methyl-7-chloro-10 - γ - morpholino-propyl-10,11-dihydro-5H-dibenzo-[b,e][1,4]-diazepine, 5,11-dimethyl-10-β-pyrrolidino-ethyl - 10,11 - dihydro-5H-dibenzo-[b,e][1,4]-diazepine, 5,11-dimethyl-10-γ-pyrrolidino-propyl - 10,11-dihydro-5H-dibenzo-[b,e][1,4]-diazepine, 5,11-dimethyl-10-β-(N' - methylpiperazino) - ethyl-10,11-dihydro-5H-dibenzo-[b,e][1,4]-diazepine, 8-chloro-10-β-(N'-methylpiperazino) - ethyl - 10,11-dihydro-5H-dibenzo-[b,e][1,4]-diazepine, 7-chloro-10-β-(N'-methylpiperazino) - ethyl - 10,11-dihydro-5H-dibenzo-[b,e][1,4]-diazepine, 8,11-dimethyl-10-β-(N' - methylpiperazino) - ethyl-10,11-dihydro-5H-dibenzo-[b,e][1,4]-diazepine, 8-methoxy-10-β-(N'-methylpiperazino) - ethyl - 10,11-dihydro-5H-dibenzo-[b,e][1,4]-diazepine, 5,11-dimethyl-10-γ - (N' - methylpiperazino) - propyl-10,11-dihydro-5H-dibenzo-[b,e][1,4]-diazepine, 8-chloro-10-γ-(N' - methylpiperazino) - propyl - 10,11-dihydro-5H-dibenzo-[b,e][1,4]-diazepine, 7-chloro-10-γ-(N' - methylpiperazino) - propyl - 10,11-dihydro-5H-dibenzo-[b,e][1,4]-diazepine, 8,11-dimethyl-10-γ-(N'-methylpiperazino) - propyl-10,11-dihydro-5H-dibenzo-[b,e][1,4]-diazepine, and 8-methoxy-10-γ-(N'-methylpiperazino)-propyl - 10,11-dihydro-5H-dibenzo-[b,e][1,4]-diazepine.

Production of tablets

For the manufacture of tablets, the products of the present invention, preferably in the form of the hydrochlorides or of the maleates, can be mixed with lactose and granulated with water, 0.5% sodium alginate solution or 1% gelatine solution. The dried granulate can be compressed into tablets in the presence of about 5% of talcum, 5% of corn starch and 0.1% of magnesium stearate. In this way, there are obtained, for example, tablets of the following composition:

| | Mg. |
|---|---|
| 5,11-dimethyl - 10 - β - dimethylamino - ethyl - 10,11-dihydro-11-methyl - 5H - dibenzo[b,e][1,4]diazepine maleate | 25 |
| Lactose | 155 |
| Corn starch | 10 |
| Talcum | 10 |
| Magnesium stearate | 0.2 |

These 0.200 gm. tablets possess antidepressant action and can be given orally in appropriate indications.

Production of solutions

Injectable solutions are obtained, for example, by dissolving in bidistilled water the products of the present invention in the form of their hydrochlorides or other salts and by adding sodium chloride or glucose until isotonic concentration is reached. The solutions are filtered free of germs, filled into ampoules and sterilized for 30 minutes at 120° C. in the autoclave. In this way, there are obtained, for example, injectable solutions of the following composition:

| | | |
|---|---|---|
| 8-chloro-10-β-dimethylamino-ethyl - 10,11 - dihydro-5H-dibenzo[b,e][1,4]diazepine hydrochloride | mg | 2 |
| Glucose | mg | 49 |
| Bidistilled water | ml | Up to 2 |

These solutions can be administered by intravenous injection, in conditions where anticonvulsant activity is desired, for instance, in patients showing epileptic symptoms.

Production of suppositories

Suppositories are obtained, for example, by grinding to a fine powder the products of the present invention in the form of bases or salts, by mixing intimately with a molten suppository mass (e.g., Oleum Cacao, Witten mass and the like) if necessary in the presence of paraffin oil, by pouring the mixture into moulds and by allowing to cool at low temperature. In this way, there are obtained, for example, suppositories of the following composition:

| | Mg. |
|---|---|
| 7-chloro-10-β-piperidino - ethyl - 10,11 - dihydro-5H-dibenzo[b,e][1,4]diazepine maleate | 5 |
| Paraffin oil | 95 |
| Oleum cacao | 210 |

These suppositories can be administered in order to depress motility in appropriate indications.

We claim:

1. A compound selected from the group consisting of a 10-(basic substituted)-10,11-dihydro-5H-dibenzo[b,e][1,4]diazepine of the formula

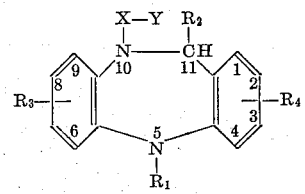

wherein X represents alkylene having between 2 and 3 inclusive carbon atoms; Y is a member of the class consisting of dialkylamino having between 2 and 4 inclusive carbon atoms, pyrrolidino, piperidino, and morpholino; $R_1$ and $R_2$ represent, interchangeably, a member of the class consisting of hydrogen, methyl, and ethyl; and $R_3$ and $R_4$ represent, interchangeably, a member of the class consisting of hydrogen, chlorine, methyl, ethyl, methoxy, and ethoxy; and non-toxic therapeutically useful acid addition salts and lower alkyl quaternary ammonium halides, sulfates, and sulfonates thereof.

2. 8-chloro-10-β-dimethylamino-ethyl - 10,11-dihydro-5H-dibenzo[b,e][1,4]diazepine.

3. 5,11-dimethyl-10 - β - dimethylamino - ethyl - 10,11-dihydro-5H-dibenzo[b,e][1,4]diazepine.

4. 2-chloro-10-β-dimethylamino - ethyl-10,11-dihydro-5H-dibenzo[b,e][1,4]diazepine.

5. 7-chloro-10-β-piperidino-ethyl - 10,11 - dihydro-5H-dibenzo[b,e][1,4]diazepine.

6. 5,8-dimethyl-10-β - dimethylamino - ethyl - 10,11-dihydro-5H-dibenzo[b,e][1,4]diazepine.

7. 8-methoxy-10 - β - dimethylamino - ethyl - 10,11-dihydro-5H-dibenzo[b,e][1,4]diazepine.

8. 10 - β - dimethylamino - ethyl - 10,11 - dihydro - 5H-dibenzo-[b,e][1,4]-diazepine.

9. 5-methyl-10-β-dimethylamino - ethyl - 7 - chloro-10,11-dihydro-5H-dibenzo-[b,e][1,4]-diazepine.

10. 10-γ-dimethylamino-propyl - 10,11 - dihydro - 5H-dibenzo-[b,e][1,4]diazepine.

11. 5-methyl-10-γ - dimethylamino - propyl - 10,11-dihydro-5H-dibenzo-[b,e][1,4]-diazepine.

12. 8-chloro - 10 - γ - dimethylamino-propyl-10,11-dihydro-5H-dibenzo-[b,e][1,4]-diazepine.

13. 5-methyl - 10 - β - dimethylamino-ethyl - 10,11-dihydro-5H-dibenzo-[b,e][1,4]-diazepine.

14. 5,11-dimethyl-10 - γ - dimethylamino-propyl-10,11-dihydro-5H-dibenzo-[b,e][1,4]-diazepine.

15. 5,11-dimethyl - 10 - β - piperidino-ethyl - 10,11-dihydro-5H-dibenzo-[b,e][1,4]-diazepine.

16. 5,11-dimethyl - 10 - γ - piperidino-propyl-10,11-dihydro-5H-dibenzo-[b,e][1,4]-diazepine.

17. 5,11-dimethyl - 10 - β - morpholino-ethyl-10,11-dihydro-5H-dibenzo-[b,e][1,4]-diazepine.

18. 5,11-dimethyl-10 - γ - morpholino-propyl-10,11-dihydro-5H-dibenzo-[b,e][1,4]-diazepine.

19. A member selected from the group consisting of a compound of the formula

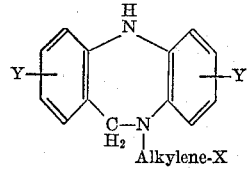

and the therapeutically acceptable acid addition and quaternary ammonium salts thereof; wherein alkylene has 2 to 4 carbons inclusive, and at least two carbons separate X from the heterocyclic nucleus; X is selected from the group consisting of dialkylamino of 2 to 4 carbons, pyrrolidino, piperidino, and morpholino; and each Y is independently selected from the group consisting of hydrogen, chlorine, methyl, ethyl, methoxy and ethoxy.

No references cited.

ALEX MAZEL, *Primary Examiner.*

IRVING MARCUS, *Examiner.*

ALTON D. ROLLINS, *Assistant Examiner.*